(12) United States Patent
Jahn et al.

(10) Patent No.: US 9,352,977 B2
(45) Date of Patent: May 31, 2016

(54) POWERED COMPOUNDS, METHOD FOR THE PRODUCTION THEREOF, AND USE THEREOF IN LITHIUM SECONDARY BATTERIES

(71) Applicant: H.C. Starck GmbH, Goslar (DE)

(72) Inventors: Matthias Jahn, Goslar (DE); Gerd Maikowske, Goslar (DE); Stefan Malcus, Goslar (DE); Juliane Meese-Marktscheffel, Goslar (DE); Armin Olbrich, Seesen (DE); Rüdiger Zertani, Goslar (DE)

(73) Assignee: H.C. Starck GmbH (DE)

( * ) Notice: Subject to any disclaimer, the term of this patent is extended or adjusted under 35 U.S.C. 154(b) by 0 days.

(21) Appl. No.: 14/680,267

(22) Filed: Apr. 7, 2015

(65) Prior Publication Data

US 2015/0210561 A1 Jul. 30, 2015

Related U.S. Application Data

(62) Division of application No. 12/674,597, filed as application No. PCT/EP2008/059649 on Jul. 23, 2008, now Pat. No. 9,028,710.

(30) Foreign Application Priority Data

Aug. 21, 2007 (DE) ..................... 10 2007 039 471 U (51) Int. Cl.
*H01M 4/88* (2006.01)
*C01G 53/04* (2006.01)
(Continued)

(52) U.S. Cl.
CPC .............. *C01G 53/04* (2013.01); *C01G 51/006* (2013.01); *C01G 53/006* (2013.01);
(Continued)

(58) Field of Classification Search
USPC ................... 252/182.1, 519.14; 423/138, 140, 423/594.3, 594.4, 594.5, 594.6; 428/402; 501/102, 103
See application file for complete search history.

(56) References Cited

U.S. PATENT DOCUMENTS 5,498,403 A 3/1996 Shin
6,508,583 B1 1/2003 Shankwitz et al.
(Continued)

FOREIGN PATENT DOCUMENTS

CA 2618780 A1 2/2007
CA 2644955 A1 10/2007
(Continued)

OTHER PUBLICATIONS

ASTM B 527-06 "Standard test for determination of tap density of metallic powders and compounds," Oct. 2006.
(Continued)

*Primary Examiner* — Bijan Ahvazi
(74) *Attorney, Agent, or Firm* — Drinker Biddle & Reath LLP (57) ABSTRACT

The invention is directed to a process for preparing a pulverulent compound of the formula $Ni_aM1_bM2_cO_x(OH)_y$, where M1 is Fe, Co, Zn, Cu or mixtures thereof, M2 is Mn, Al, Cr, B, Mg, Ca, Sr, Ba, Si or mixtures thereof, having the following steps:
a) providing at least a first starting solution and a second starting solution,
b) combining of at least the first starting solution and the second starting solution in a reactor and producing a homogeneously mixed reaction zone having a specific mechanical power input of at least 2 watt/liter and producing a product suspension containing insoluble product and a mother liquor which is supersaturated by setting of an excess of alkali and has a pH of 10-12,
c) partial separating the mother liquor from the precipitated product to set solids contents of at least 150 g/l in the suspension.

8 Claims, 3 Drawing Sheets

(51) Int. Cl.
*C01G 53/00* (2006.01)
*C01G 51/00* (2006.01)
C01G 51/04 (2006.01)
H01M 4/525 (2010.01)

(52) U.S. Cl.
CPC ........ *C01P 2002/52* (2013.01); *C01P 2004/03* (2013.01); *C01P 2004/51* (2013.01); *C01P 2006/11* (2013.01); *C01P 2006/12* (2013.01); *C01P 2006/40* (2013.01); *H01M 4/525* (2013.01); *Y10T 428/2982* (2015.01)

(56) References Cited

U.S. PATENT DOCUMENTS

| | | |
|---|---|---|
| 7,384,706 B2 | 6/2008 | Suhara et al. |
| 2002/0053663 A1 | 5/2002 | Ito et al. |
| 2003/0054251 A1 | 3/2003 | Ohzuku et al. |
| 2005/0221179 A1 | 10/2005 | Baeuerlein et al. |
| 2006/0083989 A1 | 4/2006 | Suhara et al. |
| 2006/0089257 A1 | 4/2006 | Albrecht et al. |
| 2007/0166614 A1 | 7/2007 | Kato et al. |
| 2008/0241053 A1 | 10/2008 | Suhara et al. |
| 2009/0302267 A1 | 12/2009 | Albrecht et al. |
| 2011/0300470 A1 | 12/2011 | Olbrich et al. |

FOREIGN PATENT DOCUMENTS

| | | |
|---|---|---|
| CN | 1358562 A | 7/2002 |
| JP | 10-027611 A | 1/1998 |
| JP | 11-317224 A | 11/1999 |
| JP | 2003323890 A | 11/2003 |
| WO | WO-2004/032260 A2 | 4/2004 |
| WO | WO-2004/092073 A1 | 10/2004 |
| WO | WO-2006001210 A1 | 1/2006 |
| WO | WO-2007/019986 A1 | 2/2007 |
| WO | WO-2007/113102 A2 | 10/2007 |

OTHER PUBLICATIONS

ASTM B 822-97 "Standard test for particle size distribution of metal powders and related compounds by light scattering," Jun. 1997.
ASTM D 3663-03 "Standard test method for surface area of catalysts and catalyst carries," Oct. 2003.

Example 1

Fig 6

Example 2

Fig 7

Comparative example 1

US 9,352,977 B2

POWERED COMPOUNDS, METHOD FOR THE PRODUCTION THEREOF, AND USE THEREOF IN LITHIUM SECONDARY BATTERIES

CROSS-REFERENCE TO RELATED APPLICATIONS

This application is a divisional application of U.S. application Ser. No. 12/674,597, filed Mar. 29, 2011 which is incorporated by reference. U.S. application Ser. No. 12/674,597 is a national stage application (under 35 U.S.C. §371) of PCT/EP2008/059649, filed Jul. 23, 2008, which claims benefit of German application 10 2007 039 471.5, filed Aug. 21, 2007.

BACKGROUND OF THE INVENTION

The present invention relates to pulverulent compounds of the formula $Ni_aM1_bM2_cO_x(OH)_y$, a process for producing them and their use as intermediate for producing lithium compounds for use in secondary lithium batteries.

JP10027611 A discloses the synthesis of a coprecipitated mixed hydroxide which comprises at least the two metals nickel and cobalt but is not restricted to these. The coprecipitated mixed hydroxide is processed further to give lithium mixed metal oxides as active composition for secondary lithium batteries. Coprecipitation of the elements at the stage of the intermediate makes it possible to produce a lithium mixed metal oxide which when used in secondary lithium batteries leads to an improvement in the electrochemical cycling behavior. The molar proportion of nickel in the lithium mixed metal oxides, based on the metallic elements apart from lithium, is at least 70%.

JP 11-317224 A describes the synthesis of manganese- and cobalt-doped nickel hydroxides by means of coprecipitation. The synthesis is carried out under reducing or inert conditions in order to avoid oxidation of the divalent metals. The material has high tapped densities (>1.7 g/cm$^3$) and is used as active composition for secondary alkaline batteries.

US 2002/0053663 A1 claims a coprecipitated nickel-cobalt-manganese hydroxide which has a tapped density of at least 1.5 g/cm$^3$. The coprecipitated mixed hydroxide serves as intermediate for the synthesis of lithium-nickel-cobalt-manganese oxides (LNCMOs). The processes described as "conventional" in the patent do not enable mixed hydroxides having a high tapped density to be produced. The high tapped density of the mixed hydroxide is of such great importance since it has a positive effect on the tapped density of the end product, which in turn influences the volumetric energy density in a secondary lithium battery. The examples disclose powders whose tapped densities are from 1.71 to 1.91 g/cm$^3$. The average particle size of the powders is 5-20 μm.

Mixed hydroxides having high tapped densities were able to be achieved in US 2002/0053663 A by carrying out the precipitation either under inert conditions or even under reducing conditions.

US 2003/0054251 A1 describes an optimized route to the synthesis of nickel- and manganese-containing mixed oxides or mixed hydroxides as intermediates for the cathodic active composition in secondary lithium batteries. The main idea of this invention is to pretreat the coprecipitated mixed hydroxides (e.g. of the metals Ni, Co, Mn) mentioned in the literature thermally at 300-500° C. to obtain a "dry precursor" before the actual furnace process. This "dry precursor" is then admixed with a lithium component and reacted by means of ignition to form the LNCMO. If the dried intermediate described is used instead of an (undried) mixed hydroxide, an end product which has a higher product constancy than materials in which the undried mixed hydroxide was used is obtained according to this document. The product constancy of the materials was determined by making twenty batteries from each material and evaluating the variation in the capacity decrease between the third and three hundredth electrochemical cycle for these twenty batteries.

WO 2004/092073 A1 is likewise concerned with mixed metal intermediates for LNCMO materials. As in US 2003/0054251, an ideal intermediate for the synthesis of LNCMOs is sought here. US 2003/0054251 is, inter alia, mentioned as prior art therein. Since the thermal treatment of the intermediate as described in US 2003/0054251 is very complicated, an oxidation of the coprecipitated Ni—Co—Mn hydroxide to an Ni/Co/Mn oxyhydroxide is proposed as an alternative.

WO 2007/019986 discloses partially oxidized nickel mixed metal hydroxides (NCMOs), a process for producing them and their use as intermediate for producing cathode material for secondary lithium batteries.

The nickel mixed metal hydroxides are characterized in that they have a tapped density of greater than 1.7 g/cm$^3$, preferably greater than 1.9 g/cm$^3$, and an average particle size of the secondary particles of from 2 to 30 μm. The normalized width of the particle size distribution is less than 1.8.

The NCMOs are prepared here by precipitation of metal salts by means of alkalis and subsequent partial oxidation in a further reactor. A high tapped density of the partially oxidized NCMO is said to be achieved in this way.

The nickel mixed metal hydroxides prepared according to the prior art cited are used as starting materials for producing secondary lithium batteries. Such secondary batteries have only limited suitability for use in hybrid and electric vehicles. For both types of vehicles, rapid discharging and charging of the batteries is necessary to be able to achieve high accelerations and on braking of the vehicle to convert the kinetic energy thereof back into electric energy with a very low level of heat losses. At a given energy for a particular acceleration or braking process, the discharging/charging rate required, expressed in ±Δ total capacity/Δ t, is lower the higher the total capacity of the battery. Thus, a very high volume capacity of the battery is sought not only for space and cost reasons but also for electrical reasons. In the case of a pure electric vehicle, this is also absolutely necessary because the capacity naturally determines the operating range and this is absolutely critical to the marketability of such vehicles.

BRIEF SUMMARY OF THE INVENTION

It is therefore an object of the present invention to provide a starting material for producing lithium mixed metalates for use in secondary lithium batteries which have a significantly higher volume capacity and high electric power. A further object was to provide materials for the increasingly important sector of hybrid vehicles and electric vehicles (EVs, hybrid passenger cars, hybrid goods vehicles, hybrid locomotives, hybrid bicycles) which make it possible to construct batteries which give such vehicles long ranges despite high acceleration values. A further object of the present invention is to provide a process for preparing starting materials for the preparation of lithium mixed metalates.

The object is achieved by a pulverulent compound of the formula $Ni_aM1_bM2_cO_x(OH)_y$ (hereinafter also referred to as NM1M2OOH, nickel mixed metal hydroxide or nickel mixed metal oxyhydroxide), where M1 is at least one element selected from the group consisting of Fe, Co, Zn, Cu and mixtures thereof, M2 is at least one element selected from the group consisting of Mn, Al, Cr, B, Mg, Ca, Sr, Ba, Si and mixtures thereof, 0.3≤a≤0.83, 0.1≤b≤0.5, 0.01≤c≤0.5, 0.01≤x≤0.99 and 1.01≤y≤1.99, which is characterized in that the ratio of tapped density measured in accordance with ASTM B 527 to the D50 of the particle size distribution measured in accordance with ASTM B 822 is at least 0.2 g/cm³·µm.

DETAILED DESCRIPTION OF THE INVENTION

Advantageous pulverulent compounds are nickel mixed metal hydroxides in which 0.1≤x≤0.8, particularly preferably 0.2≤x≤0.7.

Pulverulent compounds which are part of the invention are listed in table 1 below.

TABLE 1

| Compound No. | a | M1 | b | M2 | c | x | y |
|---|---|---|---|---|---|---|---|
| 001 | 0.333 | Co | 0.333 | Mn | 0.333 | 0.80 | 1.20 |
| 002 | 0.333 | Co | 0.333 | Mn | 0.333 | 0.50 | 1.50 |
| 003 | 0.333 | Co | 0.333 | Mn | 0.333 | 0.05 | 1.95 |
| 004 | 0.50 | Co | 0.20 | Mn | 0.30 | 0.30 | 1.70 |
| 005 | 0.50 | Co | 0.20 | Mn | 0.30 | 0.45 | 1.55 |
| 006 | 0.40 | Co | 0.20 | Mn | 0.40 | 0.62 | 1.38 |
| 007 | 0.45 | Co | 0.10 | Mn | 0.45 | 0.47 | 1.53 |
| 008 | 0.333 | Co | 0.333 | Mn | 0.333 | 0.80 | 1.18 |
| 009 | 0.80 | Co | 0.10 | Mn | 0.10 | 0.11 | 1.89 |
| 010 | 0.80 | Co | 0.10 | Mn | 0.10 | 0.03 | 1.97 |
| 011 | 0.80 | Co | 0.10 | Mn | 0.10 | 0.05 | 1.92 |
| 012 | 0.80 | Co | 0.15 | Mg | 0.05 | 0.02 | 1.98 |
| 013 | 0.82 | Co | 0.15 | Mg | 0.03 | 0.03 | 1.97 |
| 014 | 0.78 | Co | 0.15 | Cr | 0.07 | 0.13 | 1.87 |
| 015 | 0.75 | Co | 0.20 | Ca | 0.05 | 0.06 | 1.94 |
| 016 | 0.72 | Co | 0.25 | Cr | 0.03 | 0.13 | 1.87 |
| 017 | 0.65 | Co | 0.30 | Sr | 0.05 | 0.17 | 1.83 |
| 018 | 0.82 | Fe | 0.15 | Cr | 0.03 | 0.24 | 1.76 |
| 019 | 0.68 | Fe | 0.20 | Ca | 0.12 | 0.11 | 1.89 |
| 020 | 0.76 | Zn | 0.11 | Cr | 0.13 | 0.14 | 1.86 |

The pulverulent compounds of the invention preferably have a ratio of tapped density to D50 of the particle size distribution of at least 0.25 g/cm³·µm, preferably at least 0.3 g/cm³·µm, particularly preferably at least 0.4 g/cm³·µm and very particularly preferably at least 0.5 g/cm³·µm.

The pulverulent nickel mixed metal hydroxides of the invention are characterized by their low D50 values which are less than 10 µm, preferably less than 9 µm.

Figure 2:
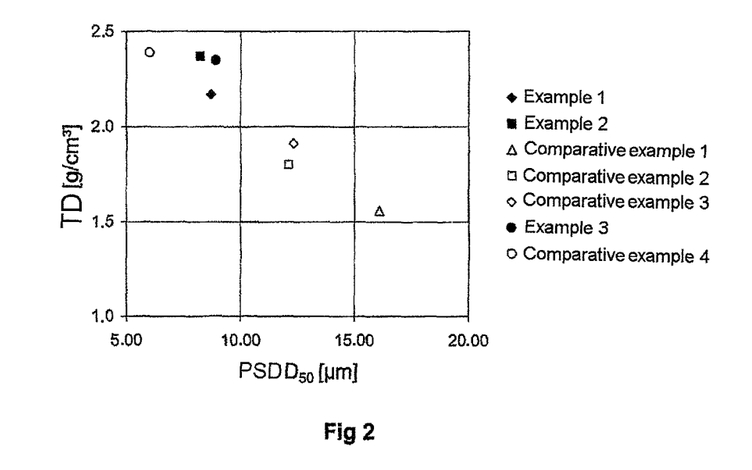
FIG. 2 illustrates the tapped density of the pulverulent compounds of the invention.

Surprisingly and in contrast to the prior art, it has been found that the tapped density of the pulverulent compounds of the invention reaches very high values despite low D50 values, FIG. 2. The tapped density naturally decreases monotonically with decreasing D50 of the powders.

The tapped density of the pulverulent compounds of the invention, measured in accordance with ASTM B 527, is ≥2.0 g/cm³, preferably ≥2.1 g/cm³, particularly preferably ≥2.2 g/cm³ and very particularly preferably ≥2.3 g/cm³. Particularly preferred pulverulent compounds are characterized by an even higher tapped density of ≥2.4 g/cm³.

The manganese-containing nickel mixed metal hydroxides are of particular importance here. The manganese-containing nickel mixed metal hydroxides having tapped densities of ≥2.0 g/cm³ represent a completely new category of materials. Even in the case of the manganese-containing powders having significantly higher D50 values, lower tapped densities are achieved, as can be seen from the prior art and comparative example 1 in table 1.

The preferred pulverulent compounds according to the invention are characterized, in particular, by their BET surface area. The mixed metal hydroxides of the invention preferably have BET surface areas measured in accordance with ASTM D 3663 of less than 9 m²/g, preferably less than 8 m²/g, particularly preferably less than 7 m²/g.

The mixed metal hydroxides of the invention are characterized in particular by a normalized width of the particle size distribution, defined by the formula $$\frac{D90 - D10}{D50}, \quad (1)$$

where D is the diameter of the powder particles, of ≤1.3, preferably ≤1.2, particularly preferably ≤1.0.

The preferred pulverulent compounds according to the invention are characterized by the spheroidal shape of the particles which have a shape factor of ≥0.8, preferably ≥0.9, particularly preferably ≥0.95. The shape factor of the particles can be determined by the method described in U.S. Pat. No. 5,476,530, columns 7 and 8 and FIG. 5. This method determines a shape factor of the particles which is a measure of the sphericity of the particles. The shape factor of the particles can also be determined from the scanning electron micrographs of the materials. The shape factor is determined by evaluating the particle circumference and the particle area and determining the diameter derived from the respective parameter. The diameters mentioned are obtained according to $$d_C = C/\pi \quad d_A = (4A/\pi)^{1/2}$$

The shape factor of the particles f is derived from the particle circumference C and the particle area A in accordance with:

$$f = \left(\frac{d_A}{d_C}\right)^2 = \left(\frac{4\pi A}{C^2}\right)$$

In the case of an ideal spherical particle, $d_A$ and $d_C$ are the same and a shape factor of precisely 1 would be obtained.

Figure 5:
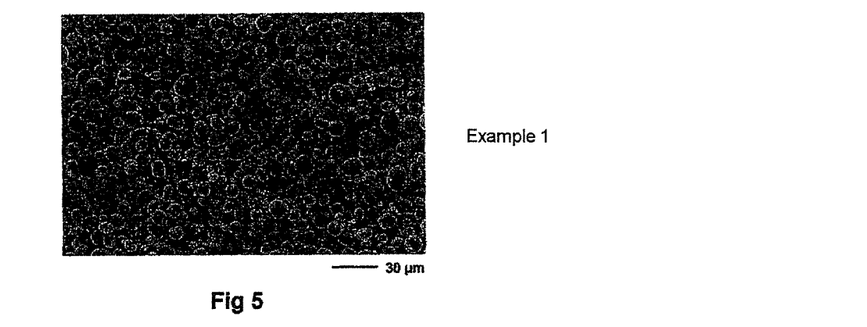
FIG. 5 shows, by way of example, images of the nickel mixed metal hydroxides prepared as described in example 1 recorded by means of a scanning electron microscope (SEM).
Figure 6:
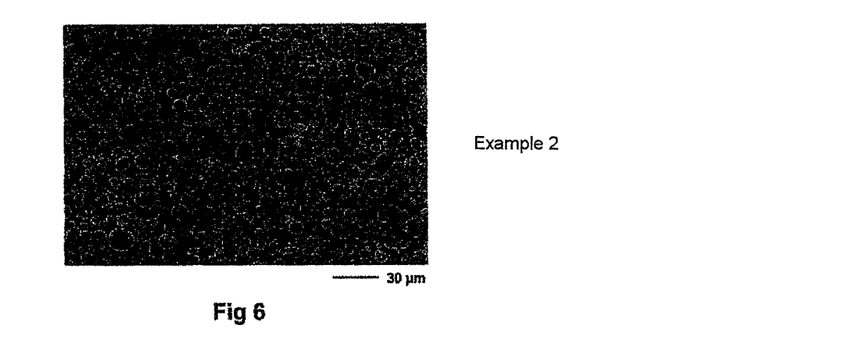
FIG. 6 shows, by way of example, images of the nickel mixed metal hydroxides prepared as described in example 2 recorded by means of a scanning electron microscope (SEM).

FIGS. 5 and 6 show, by way of example, images of the nickel mixed metal hydroxides prepared as described in examples 1 and 2 recorded by means of a scanning electron microscope (SEM).

The shape factors of the pulverulent compounds of the invention have values of ≥0.8 and are thus remarkably high in view of the fact that the materials have particle size distributions having D50 values of <10 μm.

Table 1 and FIGS. 5 and 6 show the relatively narrow particle size distribution of the nickel mixed metal hydroxides of the invention, which with values of <1.2 for the normalized particle size distribution defined by $$\frac{D90 - D10}{D50}$$

is significantly narrower than has been known hitherto.

It has been known for a long time that in the preparation of spherical nickel hydroxides or oxyhydroxides for use in nickel metal hydride batteries or for use as intermediate for the cathodic active compositions of lithium ion batteries, the normalized width of the particle size distribution has values in the range from 1.4 to a maximum of 1.6 virtually independently of the plant parameters and their variation within the usual ranges. The tapped densities achieved are not more than 60% of the physical density of the materials. This value is significantly below the theoretical packing density of 74% for spheres of uniform size. It can be presumed that at normalized particle size distributions whose value deviates significantly, viz. at least 20%, from 1.5, it is possible to achieve higher packing densities and thus also tapped densities which are greater than 60% of the physical density.

The invention further provides a novel process for preparing pulverulent compounds, which comprises the following steps:
a) provision of at least a first starting solution and a second starting solution,
b) combining of at least the first starting solution and the second starting solution in a reactor and production of a homogeneously mixed reaction zone having a specific mechanical power input of at least 2 watt/liter and production of a product suspension comprising insoluble product and a mother liquor which is supersaturated by setting of an excess of alkali and has a pH of 10-12,
c) partial separation of the mother liquor from the precipitated product to set solids contents of at least 150 g/liter in the suspension by means of clarification and/or filtration elements,
d) taking of the product suspension from the reactor.

The process of the invention is preferably carried out at a specific power input of at least 3 W/l, particularly preferably at least 4 W/l.

The process of the invention makes it possible to prepare nickel mixed metal hydroxides of the group of metals consisting of, for example, Fe, Co, Zn, Cu, Mn, Al, Cr, B, Mg, Ca, Sr, Ba, Si. Starting solutions of water-soluble salts of mineral acids, e.g. sulfuric acid, hydrochloric acid or nitric acid, of the abovementioned metals and/or mixtures thereof are used as starting materials.

The starting solutions can be produced by dissolving the appropriate metal chlorides, metal sulfates or metal nitrates in water or dissolving the metals in the corresponding mineral acids. The alkali metal hydroxides are provided in the desired concentration as aqueous solution.

The process is particularly suitable for preparing nickel mixed metal hydroxides according to the invention. As precursors, it is possible to use water-soluble metal salts, e.g. nickel sulfate, nickel nitrate, nickel halides such as chlorides and/or mixtures thereof.

The nickel mixed metal hydroxides can be prepared both with a spheroidal particle shape or a nonspheroidal particle shape, with the preparation of the spheroidal particles being carried out in the presence of ammonia or ammonium salts.

Figure 1:
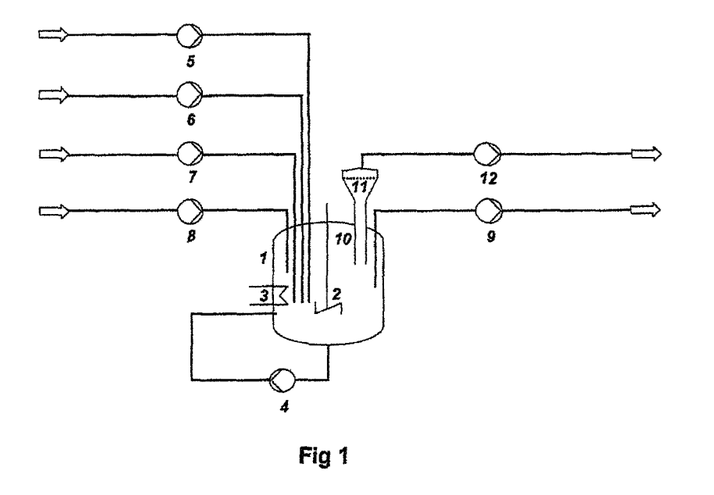
FIG. 1 illustrates the preparation of the nickel hydroxides according to the invention.

The preparation of the nickel hydroxides according to the invention is preferably carried out in a reactor (1) as depicted in FIG. 1 by precipitation crystallization from aqueous nickel salt solutions at a pH of 10-12, preferably 11-12, by introduction of alkali metal hydroxide solutions and if appropriate ammonia, in gaseous form or as an aqueous solution. As alkali metal hydroxide solutions, preference is given to using sodium hydroxide or potassium hydroxide. Although the precipitation crystallization can be carried out batchwise or semicontinuously, it is preferably carried out continuously. In the continuous process, metal salt solution, alkali metal hydroxide solution and ammonia solution are simultaneously fed into the reactor and the product suspension is continuously taken off via a free overflow or a pump.

Preferred pulverulent compounds which are very fine and have particularly high tapped densities are obtained when the solids concentration in the suspension is preferably at least 200 g/l, particularly preferably at least 300 g/l and very particularly preferably at least 400 g/l. Very particularly high tapped densities are achieved when the solids concentration in the suspension is at least 500 g/l.

To achieve high tapped densities in the case of spherical materials, particular product properties have to be optimized. Firstly, the individual particles have to have a very compact structure, i.e. they must not have excessively high porosities. However, this in itself is not sufficient for a high tapped density since the latter also depends on the achievable packing density. Finally, the packing density which can be achieved by tapping also depends on the surface roughness, the particle size distribution and the sphericity of the particles.

The preferred pulverulent compounds having high tapped densities are characterized by low D50 values of the particle size distribution.

There is therefore a whole series of process parameters by means of which the average particle size can be adjusted. The supersaturation of the mother liquor with the corresponding metal ions, for example, is very important. In the case of the nickel mixed metal hydroxides of the invention, this depends on the hydroxide ion concentration and the concentration of the complexing agent ammonia in the mother liquor. In the case of high alkali concentrations and low ammonia concentrations in the mother liquor, the solubility of the metals concerned is very low, the supersaturation is correspondingly very high and primary homogeneous nucleation is very pronounced. Thus, very many particles grow in this case and the average particle size which can be achieved remains relatively low. Depending on the composition of the products, there are complicated dependencies on the temperature, hydroxide ion concentration and complexing agent concentration. The stirrer speed, which has been found to be responsible for satisfactory mixing, also plays an important role in the precipitation of the nickel mixed metal hydroxides of the invention.

If the above-described high supersaturations are employed, the stirrer speed has no highly pronounced influence in the processes of the prior art having solids concentrations of typically 100 g/l. If very low supersaturations at which this is possible because there are no secondary conditions in respect of the microcrystalline structure, for example a requirement for small crystallite sizes, which prevent this are employed, the average particle diameter increases greatly since primary homogeneous nucleation is much lower. Under these conditions, the stirrer speed then has a strong influence.

Figure 7:
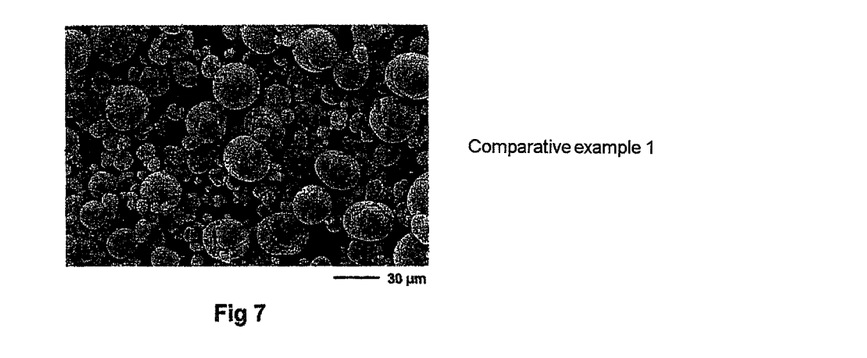
FIG. 7 shows, by way of example, the prior art as described in comparative example 1 recorded by means of a scanning electron microscope (SEM).

In the preparation of preferred manganese-containing pulverulent compounds according to the present invention, it has been found that the optimal concentration of hydroxide ions is less than 1 g/l. This is due to the high supersaturation of the manganese(II) ions since the solubility of these is significantly lower because of reduced complex formation with ammonia compared to nickel and cobalt. If the synthesis of manganese-containing mixed metal hydroxides according to the invention is carried out at concentrations of from 0.1 to 0.2 g/l of NaOH; from 6 to 12 g/l of $NH_3$, at a temperature of from 40 to 60° C., a moderate stirrer speed sufficient for good homogenization and customary solids concentrations of from 80 to 120 g/l as per the prior art, spherical particles having a high shape factor (FIG. 7, comparative example 1) are obtained but the required tapped density of ≥2 g/cm$^3$ is not achieved, as can be seen from table 2.

The nickel mixed metal hydroxides of the invention can preferably be prepared in the plant depicted in FIG. 1. The process of the invention is described in somewhat more detail below with the aid of FIG. 1.

A reactor (1) equipped with stirrer (2), thermostat (3) and circulation pump (4) is firstly filled with mother liquor having the salt concentration, NaOH concentration and $NH_3$ concentration of the later steady state. After stirrer, heating and circulation pump have been switched on, metal sulfate solution, sodium hydroxide solution, ammonia and water are fed in via the metering pumps (5), (6), (7) and (8). The product suspension formed is taken off from the reactor in a fill level-controlled manner via the pump (9). The reactor is also equipped with an immersed tube (10) which at the end of a conical widening has a filter plate (11). Mother liquor can be taken from the reactor via this filter element by means of the pump (12). In this way, the solids content of the product suspension can be set independently of the starting material concentrations and the salt concentration in the mother liquor. In particular, very high solids concentrations which are many times the stoichiometric concentration can be achieved as a result. As an alternative to the immersed tube having a filter element, the mother liquor can also be taken off from the reactor by means of a hydrocyclone or crossflow filtration. Furthermore, the option of addition of water via the pump (8) makes complete decoupling of the process parameter's solids concentration and neutral salt concentration possible.

The material is collected in each case in the steady state after 6-7 residence times over a period of 24 hours, filtered on a suction filter and washed with 5 liters of water per kg. The material is subsequently dried at temperatures of up to 90° C. in a drying oven. The nickel mixed metal hydroxides according to the invention are prepared at temperatures of from 30° C. to 95° C., preferably from 40 to 60° C. To achieve a homogeneously mixed reaction zone in the reactor, it is possible to use all customary types of stirrer. Particularly good results are achieved using propeller stirrers or disk stirrers. It can be seen from comparative example 1 (table 2, FIG. 7) that although high D50 values of the particle size distribution of 16.1 μm can be achieved at a low specific energy input of 19 Wh/l (watt hours per liter of suspension produced) and a power input into the stirred vessel of 0.94 W/l (watt per liter) and a solids concentration of 88 g/l, the tapped density of 1.6 g/cm$^2$ is too low.

The specific power input into the reactor is defined as the energy transferred by the stirrer to the suspension per unit time and unit volume. The specific energy input is defined as the energy transferred by the stirrer to a unit volume of the suspension.

The width of the particle size distribution is 1.36 and thus in the usual range, and the specific surface area is comparatively high at 14.2 m$^2$/g, as can be seen from FIG. 7.

Proceeding from this starting point, in comparative example 2 the stirrer speed was increased from 600 rpm to 1100 rpm and the specific energy input was correspondingly increased to 62 Wh/l of suspension produced. The power input into the stirred vessel was increased to 3.11 W/l. Although a significant effect in terms of a reduction in the D50 to 12.1 μm was observed, the tapped density was 1.8 g/cm$^3$. Finally, in comparative example 3, the process of the invention was utilized to increase the solids content to 150 g/l. The stirrer speed was set to 600 rpm so that a specific energy input of 19 Wh/l of suspension produced and a power input into the reactor of 0.97 W/l were obtained, exactly as in the first comparative example. It can be seen from table 2 that the result here is similar to that in the second comparative example. The tapped density is 1.9 g/cm$^3$. Only the combination of the high specific energy input per liter of suspension produced and a high solids concentration enabled the properties of the pulverulent compounds according to the invention to be achieved.

The specific energy input having the dimension energy (Wh) per liter of suspension produced depends not only on the stirrer power but also on the volume of suspension formed per unit time and thus indirectly on the residence time. Long residence times are therefore advantageous in principle. On the other hand, very high space-time yields have to be obtained in the industrial process for economic reasons, i.e. very short residence times have to be employed. At long residence times, there is the fundamental risk of coarsening of at least the primary crystallites but also the agglomerates as a result of recrystallization or Ostwald ripening. At very short residence times, the porosity is not reduced to the minimal possible level, which has a direct undesirable effect on the tapped density. The tapped density can be best maximized in the preferred and particularly preferred residence time ranges. The residence time can be from 2 to 30 hours, preferably from 4 to 25 hours, particularly preferably from 6 to 20 hours and very particularly preferably from 6 to 15 hours.

Examples 1 and 2 according to the invention were carried out at specific energy inputs of 65 and 68 Wh/l of suspension, respectively, and the solids content of the suspension in these examples was 150 g/l and 250 g/l, respectively. Surprisingly, not only have the D50 values of the particle size distribution dropped to <10 μm but the particle size distribution has become narrower. It is 0.92 and 0.94, respectively, in examples 1 and 2. This narrow particle size distribution leads to a high packing density of the particles with particularly high tapped densities of at least 2.2-2.4 g/cm$^3$, FIGS. 5 and 6.

Figure 3:
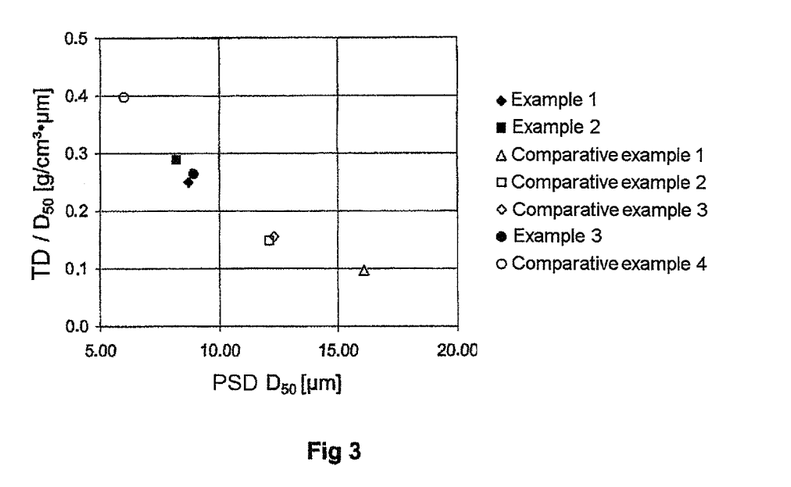
FIGS. 3 and 4 show the characteristic features of the pulverulent compounds according to the present invention compared to the powders according to the prior art.
Figure 4:
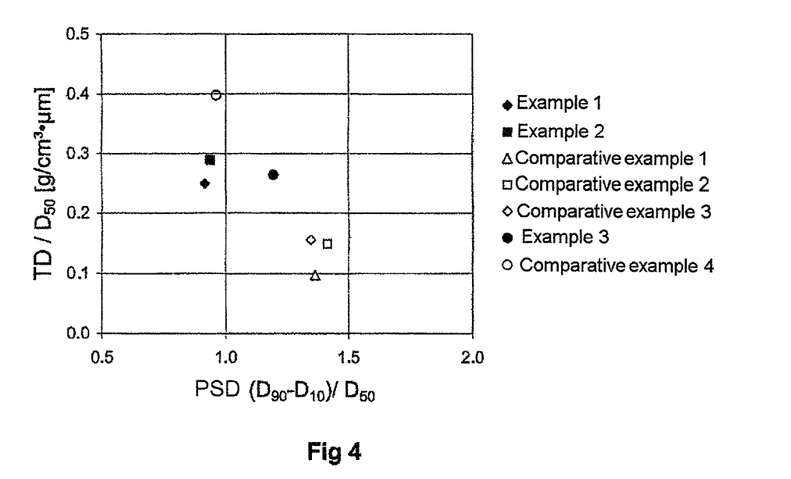

The rapid charging and rapid discharging which is important, in particular, for hybrid vehicles and electric vehicles and also for power tools is reflected in the ratio of tapped density to D50. In the products according to the invention, this parameter is at least 0.2 g/cm$^3$·μm, FIGS. 3 and 4. FIGS. 3 and 4 show the characteristic features of the pulverulent compounds according to the present invention compared to the powders according to the prior art.

The pulverulent compounds of the invention are suitable as intermediates for producing secondary batteries. In particular, the pulverulent compounds are used in lithium ion cells or lithium polymer cells. The secondary batteries containing the powders of the invention are particularly suitable for use in hybrid vehicles, electric vehicles, solar mobiles and in vehicles powered by fuel cells.

The invention is illustrated by the following examples and comparative examples.

EXAMPLES

All examples and comparative examples were carried out in the reactor as shown in FIG. 1. A general description of the procedure for carrying out the examples is given below.

General Description

The reactor (1) is firstly filled with mother liquor having $Na_2SO_4$, NaOH and $NH_3$ concentrations corresponding to the respective steady state of the reactor. Stirrer (2), thermostatic heating (3) and circulation pump (4) are then switched on. After the respective reaction temperature has been reached, the gravimetrically regulated pumps (5) to (8) are started up. Pump (5) conveys metal salt solution, pump (6) conveys sodium hydroxide solution, pump (7) conveys ammonia solution and pump (8) conveys deionized (DI) water into the reactor. Pump (9) is subsequently started up; this continuously conveys the product suspension formed from the reactor in a fill level-controlled manner. The gravimetrically regulated, self-priming pump (12) which is arranged above an immersed tube (10) in whose upper part a filter plate (11) is arranged is then started up in order to take off the required amount of mother liquor from the reactor system and set the solids content of the suspension desired in each case.

Example 1

The reactor (1) was charged with mother liquor containing 140 g/l of $Na_2SO_4$, 0.1 g/l of NaOH and 10 g/l of $NH_3$ and the stirrer (2) at 1100 rpm and the circulation pump (4) at 10 m³/h were started up. The reactor was subsequently heated to 50° C. by means of the thermostatic heating. After the intended temperature had been reached, 11 132 g/h of metal sulfate solution (34.02 g/l of Ni, 34.16 g/l of Co, 31.85 g/l of Mn) by means of pump (5), 7384 g/h of sodium hydroxide solution (200 g/l of NaOH) by means of pump (6) and 642 g/h of ammonia solution (225 g/l of $NH_3$) by means of pump (7) were introduced, gravimetrically regulated, into the reactor. 7384 g/h of mother liquor were taken off from the reactor via the immersed tube (10) with filter element (11) by means of the pump (12). The pump (9) conveyed 11 592 g/h of suspension from the reactor in a fill level-controlled fashion. After 120 hours, the reactor had reached its steady state and the suspension conveyed out of the reactor from this point in time was collected over a period of 24 hours in a reservoir, subsequently drained onto a suction filter and filtered. The filter cake was washed with 170 liters of DI water and subsequently dried at 85° C. on sheet metal trays for 24 hours in a drying oven. This gave 34.3 kg of dry product having the following properties:

21.4% of Ni, 21.5% of Co, 20.1% of Mn
Particle size distribution ($D_{10}$: 5.0 µm, $D_{50}$: 8.7 µm, $D_{90}$: 13.0 µm), ($D_{90}-D_{10}$)/$D_{50}$: 0.92
Tapped density (TD): 2.17 g/cm³
KD/$D_{50}$: 0.249 g/cm³·µm
BET: 7.8 m²/g

Comparative Example 1

The reactor (1) was charged with mother liquor containing 140 g/l of $Na_2SO_4$, 0.1 g/l of NaOH and 10 g/l of $NH_3$ and the stirrer (2) at 600 rpm and the circulation pump (4) at 10 m³/h were started up. The reactor was subsequently heated to 50° C. by means of the thermostatic heating. After the intended temperature had been reached, 6494 g/h of metal sulfate solution (34.02 g/l of Ni, 34.16 g/l of Co, 31.85 g/l of Mn) by means of pump (5), 4307 g/h of sodium hydroxide solution (200 g/l of NaOH) by means of pump (6) and 374 g/h of ammonia solution (225 g/l of $NH_3$) by means of pump (7) were introduced, gravimetrically regulated, into the reactor. In contrast to example 1, no mother liquor was taken off from the reactor by means of the pump (12). The pump (9) conveyed 11 175 g/h of suspension from the reactor in a fill level-controlled fashion. After 120 hours, the reactor had reached its steady state and the suspension conveyed out of the reactor from this point in time was collected over a period of 24 hours in a reservoir, subsequently drained onto a suction filter and filtered. The filter cake was washed with 100 liters of DI water and subsequently dried at 85° C. on sheet metal trays for 24 hours in a drying oven. This gave 20.0 kg of dry product having the following properties:

21.2% of Ni, 21.5% of Co, 20.1% of Mn
Particle size distribution ($D_{10}$: 8.6 µm, $D_{50}$: 16.1 µm, $D_{90}$: 13.6 µm), ($D_{90}-D_{10}$)/$D_{50}$: 1.36
Tapped density (TD): 1.56 g/cm³
KD/$D_{50}$: 0.097 g/cm³·µm
BET: 14.2 m²/g Table 2 below summarizes the reactor parameters and the properties of the products obtained from example 1 and comparative example 1 and also the further examples and comparative examples.

TABLE 2

| Reference numeral | | Example 1 | Example 2 | Comparative example 1 | Comparative example 2 | Comparative example 3 | Example 3 | Example 4 |
|---|---|---|---|---|---|---|---|---|
| 1 | Reactor volume $V_R$ [l]: | 190 | 190 | 190 | 190 | 190 | 190 | 190 |
| 2 | Stirrer speed [rpm]: | 1100 | 1100 | 600 | 1100 | 600 | 1100 | 1100 |
|   | Stirrer power P [kW]: | 0.61 | 0.65 | 0.18 | 0.59 | 0.19 | 0.65 | 0.74 |
|   | P/$V_R$ [W/l]: | 3.23 | 3.41 | 0.94 | 3.11 | 0.97 | 3.41 | 3.88 |
|   | P/flow$_{susp}$ [Wh/l]: | 65 | 68 | 19 | 62 | 19 | 68 | 78 |
| 3 | T [° C.]: | 50 | 50 | 50 | 50 | 50 | 40 | 40 |
| 4 | Circulation [m³/h]: | 10 | 10 | 10 | 10 | 10 | 10 | 10 |
| 5 | Metal salt solution [g/h]: | 11 132 | 18 553 | 6494 | 6494 | 11 132 | 18 675 | 37 349 |
|   | Ni [g/l]: | 34.02 | 34.02 | 34.02 | 34.02 | 34.02 | 70.25 | 70.25 |
|   | Co [g/l]: | 34.16 | 34.16 | 34.16 | 34.16 | 34.16 | 20.16 | 20.16 |
|   | Mn [g/l]: | 31.85 | 31.85 | 31.85 | 31.85 | 31.85 | 0.00 | 0.00 |
|   | Fe [g/l]: | 0.00 | 0.00 | 0.00 | 0.00 | 0.00 | 9.55 | 9.55 |
| 6 | Sodium hydroxide solution [g/h]: | 7384 | 12 306 | 4307 | 4307 | 7384 | 12 198 | 24 395 |
|   | NaOH [g/l]: | 200 | 200 | 200 | 200 | 200 | 200 | 200 |
| 7 | Ammonia [g/h]: | 642 | 1069 | 374 | 374 | 642 | 850 | 1700 |
|   | $NH_3$ [g/l]: | 225 | 225 | 225 | 225 | 225 | 225 | 225 |

TABLE 2-continued

| Reference numeral | | Example 1 | Example 2 | Comparative example 1 | Comparative example 2 | Comparative example 3 | Example 3 | Example 4 |
|---|---|---|---|---|---|---|---|---|
| 8 | DI water [g/h]: | 0 | 0 | 0 | 0 | 0 | 0 | 1 |
| 12 | Mother liquor [g/h]: | 7564 | 19 668 | 0 | 0 | 7565 | 19 465 | 49 519 |
|  | NaOH [g/l]: | 0.1 | 0.1 | 0.1 | 0.1 | 0.1 | 0.2 | 0.2 |
|  | $NH_3$ [g/l]: | 10 | 10 | 10 | 10 | 10 | 8 | 8 |
| 9 | Flow of suspension [g/h]: | 11 592 | 12 260 | 11 175 | 11 175 | 11 592 | 12 257 | 13 926 |
|  | Solids [g/l]: | 150 | 250 | 88 | 88 | 150 | 250 | 500 |
|  | Residence time [h]: | 20 | 20 | 20 | 20 | 20 | 20 | 20 |

| Reference numeral | | Example 1 | Example 2 | Comparative example 1 | Comparative example 2 | Comparative example 3 | Example 3 | Example 4 |
|---|---|---|---|---|---|---|---|---|
|  | Amount of product [kg]: | 34.3 | 57.2 | 20.0 | 20.0 | 34.3 | 57.1 | 114.1 |
|  | Residual moisture content [%]: | 0.2 | 0.28 | 0.13 | 0.19 | 0.16 | 0.21 | 0.13 |
|  | Ni [%]: | 21.3 | 21.3 | 21.4 | 21.3 | 21.3 | 44.5 | 44.3 |
|  | Co [%]: | 21.3 | 21.5 | 21.2 | 21.2 | 21.2 | 12.9 | 12.8 |
|  | Mn [%]: | 20.1 | 19.9 | 20.0 | 20.2 | 19.8 |  |  |
|  | Fe [%]: |  |  |  |  |  | 6.2 | 6.1 |
|  | $D_{10}$ [µm]: | 5.0 | 4.6 | 8.6 | 5.7 | 7.7 | 4.5 | 3.2 |
|  | $D_{50}$ [µm]: | 8.7 | 8.2 | 16.1 | 12.1 | 12.3 | 8.9 | 5.8 |
|  | $D_{90}$ [µm]: | 13.0 | 12.3 | 30.6 | 22.8 | 24.3 | 15.1 | 9.0 |
|  | $(D_{90} - D_{10})/D_{50}$: | 0.92 | 0.94 | 1.36 | 1.41 | 1.35 | 1.19 | 1.01 |
|  | TD [g/cm³]: | 2.17 | 2.37 | 1.56 | 1.80 | 1.91 | 2.35 | 2.41 |
|  | $TD/D_{50}$ [g/cm³ · µm]: | 0.249 | 0.289 | 0.097 | 0.149 | 0.155 | 0.264 | 0.416 |
|  | BET [m²/g]: | 7.8 | 6.9 | 14.2 | 9.8 | 9.2 | 8.9 | 10.0 |

The invention claimed is:

1. A process for preparing a pulverulent compound of the formula $Ni_aM1_bM2_cO_x(OH)_y$ where M1 is at least one element selected from the group consisting of Fe, Co, Zn, Cu and mixtures thereof, M2 is at least one element selected from the group consisting of Mn, Al, Cr, B, Mg, Ca, Sr, Ba, Si and mixtures thereof, $0.3 \leq a \leq 0.83$, $0.1 \leq b \leq 0.5$, $0.01 \leq c \leq 0.5$, $0.01 \leq x \leq 0.99$ and $1.01 \leq y \leq 1.99$, wherein the ratio of tapped density measured in accordance with ASTM B527 to the D50 of the particle size distribution measured in accordance with ASTM B 822 is at least 0.2 g/cm³·µm which comprises the following steps:
a) providing at least a first starting solution and a second starting solution,
b) combining of at least the first starting solution and the second starting solution in a reactor and producing a homogeneously mixed reaction zone having a specific mechanical power input of at least 2 watt/liter and producing a product suspension comprising insoluble product and a mother liquor which is supersaturated by setting of an excess of alkali and has a pH of 10-12,
c) partial separating the mother liquor from the precipitated product to set solids contents of at least 150 g/l in the suspension by means of clarification or filtration elements and wherein the compound has a BET surface area measured in accordance with ASTM D 3663 is less than 9 m²/g and wherein the normalized width of the particle size distribution defined by the formula (1)

$$\frac{D90 - D10}{D50},$$

where D is the diameter of the powder particles, is ≤1.3.

2. The process according to claim 1, wherein the solids content in the suspension is at least 300 g/l.

3. The process according to claim 1, wherein the solids content in the suspension is at least 500 g/l.

4. The process according to claim 1, wherein the specific mechanical power input is at least 4 W/l.

5. The process according to claim 1 wherein the ratio of the tapped density to the D50 of the particle size distribution is at least 0.4 g/cm³·µm.

6. The process according to claim 1, wherein the ratio of the tapped density to the D50 of the particle size distribution is at least 0.5g/cm³·µm.

7. The process according to claim 1, wherein the compound has a BET surface area measured in accordance with ASTM D 3663 is less than 7 m²/g.

8. The process according to claim 3, wherein the specific mechanical power input is at least 4 W/l.

* * * * *